United States Patent [19]

Kurosu et al.

[11] Patent Number: 5,191,531
[45] Date of Patent: Mar. 2, 1993

[54] FUEL INJECTION CONTROL SYSTEM FOR A TWO-CYCLE ENGINE

[75] Inventors: Shinichi Kurosu, Saitama; Mitsugi Chonan, Ibaragi; Fusao Tachibana, Saitama; Hideyuki Ishikawa, Saitama; Kazuo Suzuki, Saitama; Yoshiki Yuzuriha, Gunma, all of Japan

[73] Assignees: Fuji Jukogyo Kabushiki Kaisha, Tokyo; Japan Electronic Control Systems, Gunma, both of Japan; Polaris Industries L.P., Minneapolis, Minn.

[21] Appl. No.: 602,959

[22] Filed: Oct. 25, 1990

[51] Int. Cl.$^5$ .............................. F02D 41/34
[52] U.S. Cl. .................. 364/431.05; 123/295; 123/73 C; 123/399; 123/478
[58] Field of Search ............... 364/431.05; 123/295, 123/65 R, 73 C, 445, 399, 478, 480

[56] References Cited

U.S. PATENT DOCUMENTS

| | | | |
|---|---|---|---|
| 4,735,181 | 4/1988 | Kaneko et al. | 123/361 |
| 5,035,223 | 7/1991 | Watanabe | 123/459 |
| 5,050,551 | 9/1991 | Morikawa | 123/305 |
| 5,050,559 | 9/1991 | Kurosu et al. | 123/478 |
| 5,054,444 | 10/1991 | Morikawa | 123/295 |
| 5,085,193 | 2/1992 | Morikawa | 123/497 |
| 5,086,737 | 2/1992 | Watanabe et al. | 123/305 |

FOREIGN PATENT DOCUMENTS 63-255543 10/1988 Japan.

Primary Examiner—Vincent N. Trans
Attorney, Agent, or Firm—Beveridge, DeGrandi, Weilacher & Young

[57] ABSTRACT

A first fuel injection pulse width is provided based on engine operating conditions. The amount of fuel is necessary for one combustion stroke of the engine at one time. A second fuel injection pulse width is provided based on engine operating conditions so as to inject at one time an amount of fuel for two combustion strokes of the engine. The first fuel injection pulse width is compared with a minimum value. The first fuel injection pulse width is selected when the first fuel injection pulse width is larger than the minimum value, and otherwise, the second fuel injection pulse width is selected when the first fuel injection pulse width is smaller than the minimum value. Fuel is injected at the selected injection pulse.

9 Claims, 12 Drawing Sheets

FUEL INJECTION CONTROL SYSTEM FOR A TWO-CYCLE ENGINE

BACKGROUND OF THE INVENTION

The present invention relates to a fuel injection control system for a two-cycle engine having an electronic control system such as a microcomputer.

The electronic control system having the microcomputer is commonly and widely used for controlling various components of the engine. In the system, quantity of fuel injection is calculated by the microcomputer based on the engine operating condition parameters detected by various sensors. A drive signal in dependency on fuel injection pulse width corresponding to the fuel injection quantity is applied to a fuel injector to inject fuel from the injector at a predetermined timing.

The fuel injection control system having the microcomputer is used in a four-cycle engine.

A recent two-cycle engine is also equipped with an electronic fuel injection control system. Japanese Patent Application Laid-Open 63-255543 discloses such an electronic fuel injection control system for the engine. The system has a main intake pipe for inducing fresh air to a crankcase and a sub intake pipe for directly inducing fresh air to the crankcase. A fuel injector is provided in each of the intake pipes. An electronic control unit is provided for controlling the injection timing and quantity of fuel injected from the fuel injector. In general, fuel injection timing is controlled in synchronism with engine speed.

In the four-cycle engine, the combustion in the engine is performed once at every 720 degrees of crank angle, that is two rotations of the engine. In order to supply a necessary amount of fuel to the cylinder, there are various methods such as all-cylinder simultaneous injection, group injection and sequential injection.

In the all-cylinder simultaneous injection method, one-half of necessary amount of fuel for all cylinders is injected at the same time per one rotation of the engine. In the group injection method, necessary amount of fuel is injected for every groups of the cylinders per two rotations of the engine. In the sequential injection method, necessary amount of fuel is injected for each cylinder per two rotations of the engine.

On the other hand, in the two-cycle engine, combustion is performed at every 360 degrees of crank angle, that is per one rotation of the engine. Thus, necessary amount of fuel is supplied at every one rotation of the engine.

The combustion stroke of the two-cycle engine is twice as many as the four-cycle engine when the two-cycle engine runs at the same speed as the four-cycle engine. Thus, a high power is produced by the two-cycle engine. To the contrary, a larger amount of fuel is consumed in the two-cycle engine, so that it is necessary to provide a fuel injector having a large capacity. Furthermore, the amount of fuel in a high engine speed range and in a heavy engine load range is largely different from that in a low engine speed range and in a light engine load range. If the capacity of the fuel injector is small, the fuel injection pulse width, that is opening period of the fuel injector must be largely increased in the high engine speed range and in the heavy engine load range. Since the combustion stroke is performed at every 360 degrees, the injector does not have a time to reset. As a result, the injector is kept open to cause not only malfunction of the control system but also of fuel.

However, if the capacity of the injector is increased, the fuel injection pulse width must be largely reduced in a low engine speed range and in a light engine load range. Consequently, the opening period of the injector becomes very short which may shorter than a functional limit of the injector. Therefore, the amount of the injected fuel fluctuates, thereby varying the engine speed and causing the engine stall.

SUMMARY OF THE INVENTION

The object of the present invention is to provide a fuel injection control system in which the fuel injection is controlled in proper conditions, thereby stabilizing the combustion of the engine in any operating condition.

According to the present invention, there is provided a fuel injection control system for a two-cycle engine having at least one fuel injector, and an electronic control unit for controlling operation of the engine, comprising detector means for detecting engine operating conditions including speed of the engine, first pulse width providing means for providing a first fuel injection pulse width based on engine operating conditions detected by the detector means so as to inject at one time an amount of fuel necessary for one combustion stroke of the engine, second pulse width providing means for providing a second fuel injection pulse width based on engine operating conditions detected by the detector means so as to inject at one time an amount of fuel for two combustion strokes of the engine.

The first fuel injection pulse width provided by the first providing means is compared with a minimum value controllable by the fuel injector. The first fuel injection pulse width is selected when the first fuel injection pulse width is larger than the minimum value, and the second fuel injection pulse width is selected when the first fuel injection pulse width is smaller than the minimum value. The fuel injector is driven at the selected injection pulse width.

In an aspect of the invention, the selecting means includes selector means for selecting the second fuel injection pulse width when the detected engine speed is lower than a predetermined speed.

DETAILED DESCRIPTION OF THE PREFERRED EMBODIMENTS

Figure 1A:
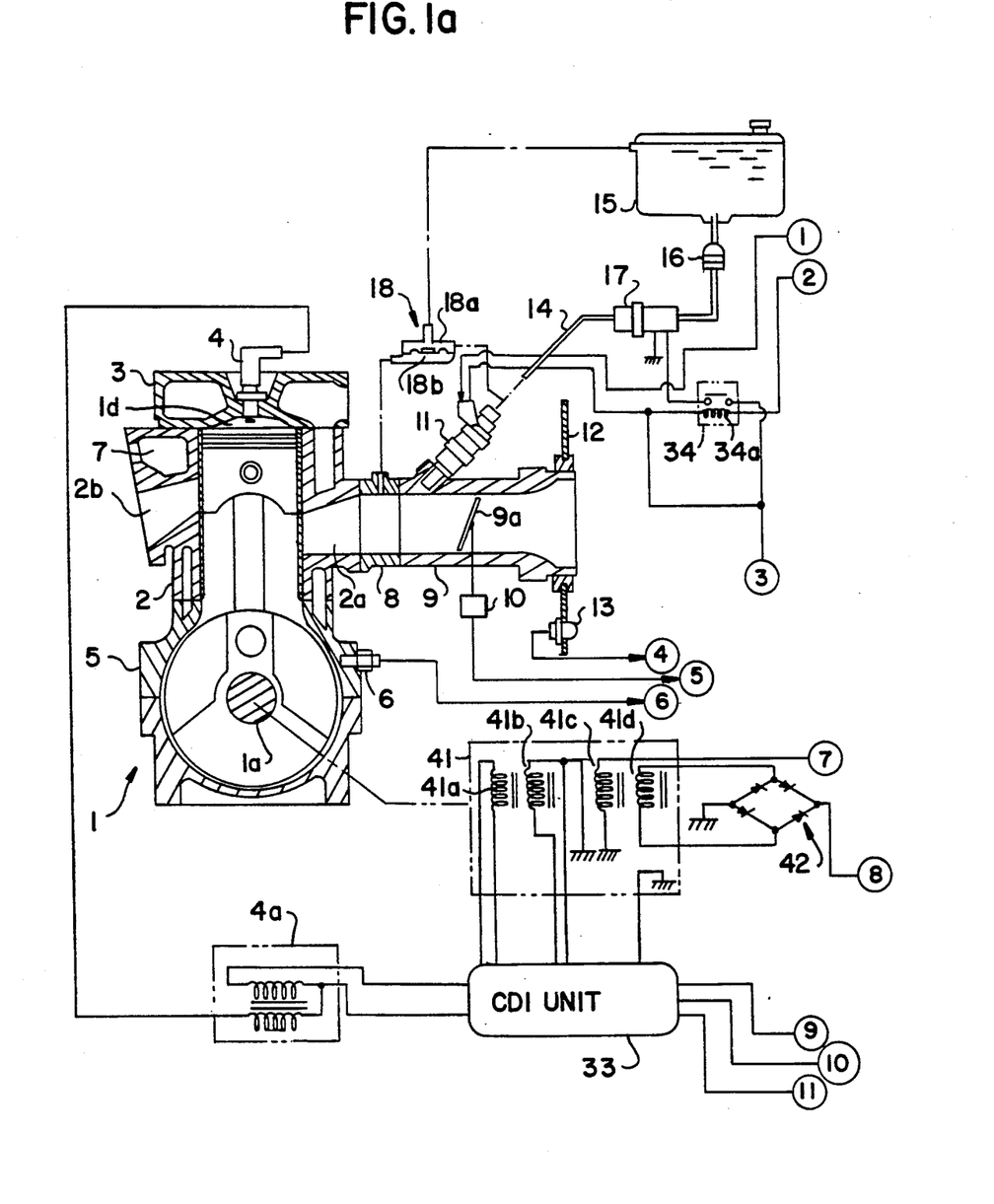
FIGS. 1a to 1c are schematic diagrams showing a control system for an engine including a circuit of the present invention.
Figure 1B:
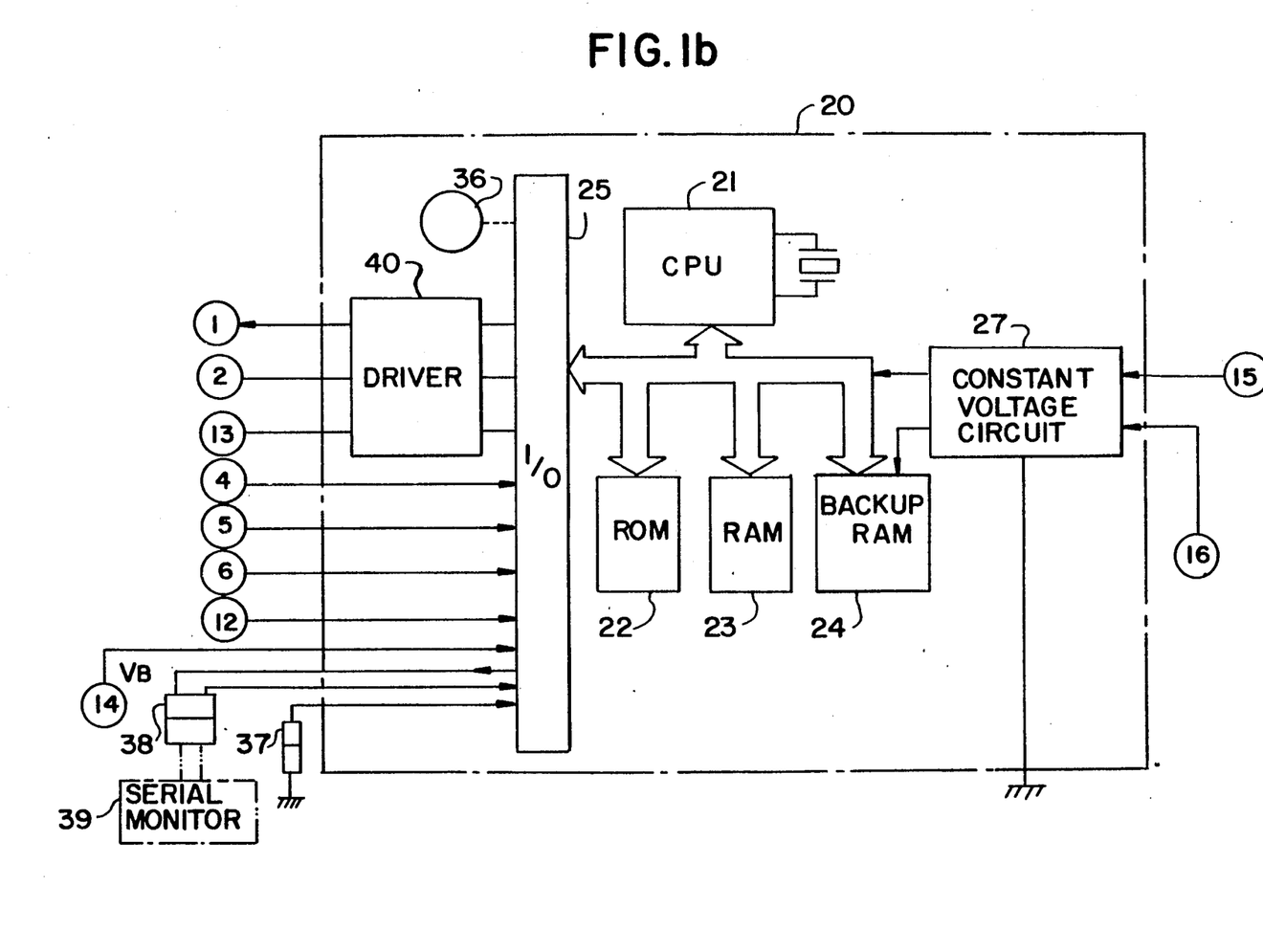
Figure 1C:
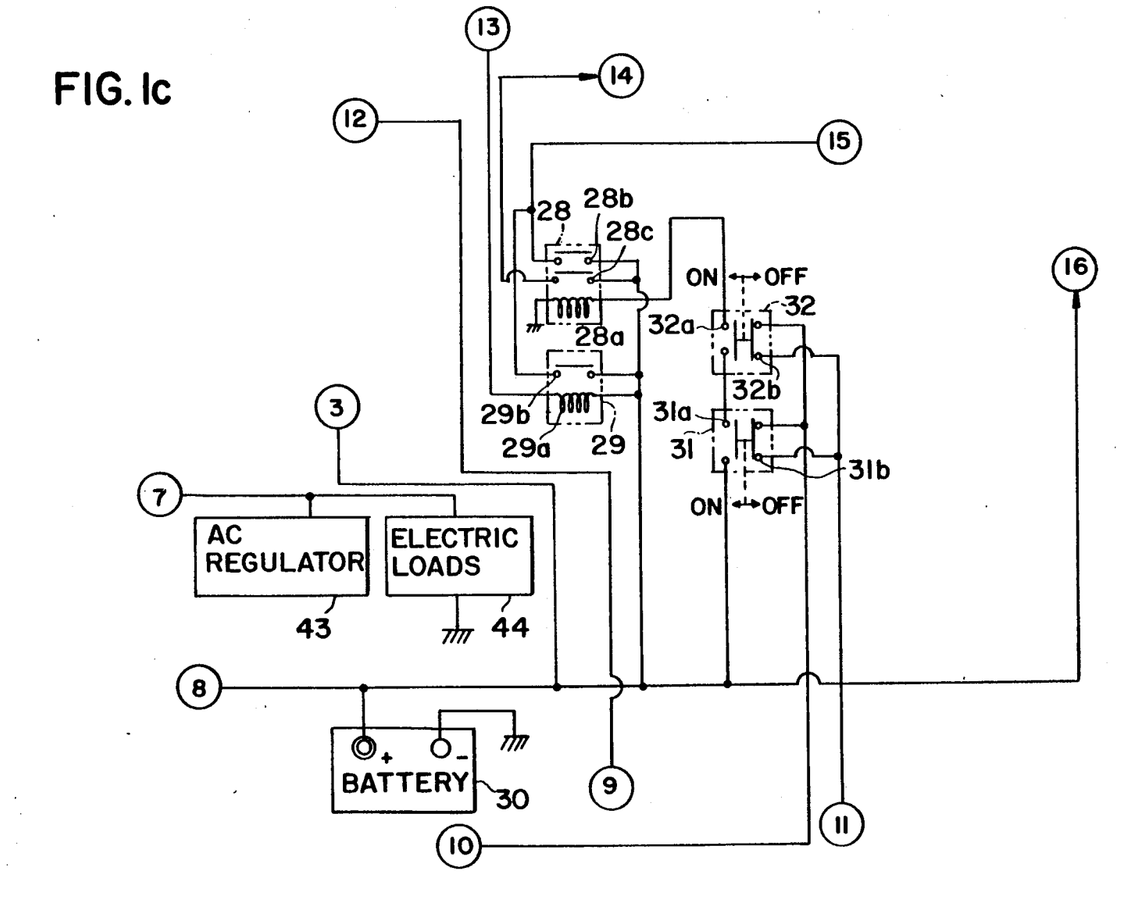

Referring to FIGS. 1a to 1c showing a two-cycle three-cylinder engine 1 for a snowmobile, a cylinder 2 of the engine 1 has an intake port 2a and an exhaust port 2b. A spark plug 4 is located in each combustion chamber formed in a cylinder head 3. A crankcase temperature sensor 6 is provided on a crankcase 5. Water jackets 7 are provided in the crankcase 5, cylinder 2 and cylinder head 3. The intake port 2a is communicated with an intake manifold 9 through an insulator 8. A throttle valve 9a is provided in the intake manifold 9. A throttle position sensor 10 is attached to the intake manifold 9. A fuel injector 11 is provided in the intake manifold 9 adjacent the intake port 2a. The intake manifold 9 is communicated with an air box 12 having an air cleaner (not shown). An intake air temperature sensor 13 is mounted on the air box 12.

Fuel in a fuel tank 15 is supplied to the injector 11 through a fuel passage 14 having a filter 16 and a pump 17.

The fuel injector 11 is communicated with a fuel chamber 18a of a pressure regulator 18 and the fuel tank 15 is communicated with an outlet of the fuel chamber 18a. A pressure regulating chamber 18b is communicated with the intake manifold 9.

The fuel in the tank 15 is supplied to the fuel injector 11 and the pressure regulator 18 by the pump 17 through the filter 16. The difference between the inner pressure of the intake manifold 9 and the fuel pressure applied to the injector 11 is maintained at a predetermined value by the pressure regulator 18 so as to prevent the fuel injection quantity of the injector 11 from changing.

An electronic control unit (ECU) 20 having a microcomputer comprises a CPU (central processing unit) 21, a ROM 22, a RAM 23, a backup RAM 24 and an input/output interface 25, which are connected to each other through a bus line 26. A predetermined voltage is supplied from a constant voltage circuit 27. The constant voltage circuit 27 is connected to a battery 30 through a contact 28b of an ECU relay 28 and a contact 29b of a self-shut relay 29 which are parallely connected with each other. Furthermore, the battery 30 is directly connected to the constant voltage circuit 27 so that the backup RAM 24 is backed up by the battery 30 so as to maintain the stored data even if a key switch (not shown) is in off-state. Sensors 6, 10 and 13 are connected to input ports of the input/output interface 25. An atmospheric pressure sensor 36 is provided in the control unit 20 and connected to an input port of the input/output interface 25. Output ports of the interface 25 are connected to a driver 40 which is connected to injectors 11 and a coil 34a of a relay 34 for the pump 17.

The ECU relay 28 has a pair of contacts 28b and 28c and an electromagnetic coil 28a. As hereinbefore described, the contact 28b is connected to the constant voltage circuit 27 and the battery 30. The other contact 28c is connected to the input port of the I/O interface 25 and the battery 30 for monitoring the voltage VB of the battery 30. The coil 28a of the relay 28 is connected to the battery 30 through ON-terminals 32a, 31a of a kill switch 32 and an ignition switch 31.

The kill switch 32 is provided on a grip (not shown) of the snowmobile to stop the snowmobile.

ON-terminals 31a and 32a of the ignition switch 31 and the kill switch 32 are connected to each other in series and OFF-terminals 31b and 32b of switches 31 and 32 are connected to each other in parallel. When both the switches 31 and 32 are turned on, power from the battery 30 is supplied to the coil 28a of the relay 28 to excite the coil to close each contact. Thus, the power from the battery 30 is supplied to the constant voltage circuit 27 through the contact 28b for controlling the control unit 20.

The self-shut relay 29 has the contact 29b connected to the constant voltage circuit 27 and the battery 30 and a coil 29a connected to the output port of the I/O interface 25 through the driver 40 and the battery 30.

When one of the switches 31 and 32 is turned off, the engine stops. After the stop of the engine, the power from the battery 30 is supplied to the coil 29a of the self-shut relay 29 for a predetermined period (for example, ten minutes) by the operation of the control unit, thereby supplying the power to the control unit 20 for the period.

When the engine is restarted while the engine is warm within the period, the quantity of fuel injected from the injector 11 is corrected to a proper value, so that the restart of the engine in hot engine condition is ensured.

The battery 30 is further connected to the coil 34a of the fuel pump relay 34 and to the injector 11 and the pump 17 through a contact of the relay 34.

As a self-diagnosis function of the system, a connector 37 for changing a diagnosis mode and a connector 38 for diagnosing the engine are connected to the input ports of the I/O interface 25. A serial monitor 39 is connected to the control unit 20 through the connector 38. The trouble mode changing connector 37 operates to change the self-diagnosis function of the control unit 20 into either a U(user)-check mode or D(dealer)-check mode. In normal state, the connector 37 is set in the U-check mode. When an abnormality occurs in the system during the driving of the vehicle, trouble data are stored and kept in the backup RAM 24. At a dealer's shop, the serial monitor 39 is connected through the connector 38 to read the data stored in the RAM 24 for diagnosing the trouble of the system. The connector 37 is changed to the D-check mode to diagnose the trouble more in detail.

Furthermore, a CDI unit 33 is provided as an ignition device. The CDI unit 33 is connected to a primary coil of an ignition coil 4a and to the spark plug 4 through a secondary coil. A signal line of the CDI unit 33 is connected to the input port of the I/O interface 25 of the control unit 20 for applying CDI pulses. When one of the switches 31 and 32 is turned off, lines for the CDI unit are short-circuited to stop the ignition operation.

A magneto 41 for generating alternating current is connected to a crankshaft 1a of the engine 1 to be operated by the engine. The magneto 41 has an exciter coil 41a, a pulser coil 41b, a lamp coil 41c, and a charge coil 41d. The exciter coil 41a and pulser coil 41b are connected to the CDI unit 33. The lamp coil 41c is connected an AC regulator 43, so that the voltage is regulated, and the regulated voltage is applied to an electric load 44 such as lamps, a heater and various accessories of the vehicle. Namely, the regulated output of the magneto is independently supplied to the electric load 44. The charge coil 41d is connected to the battery 30 through a rectifier 42.

Figure 3A:
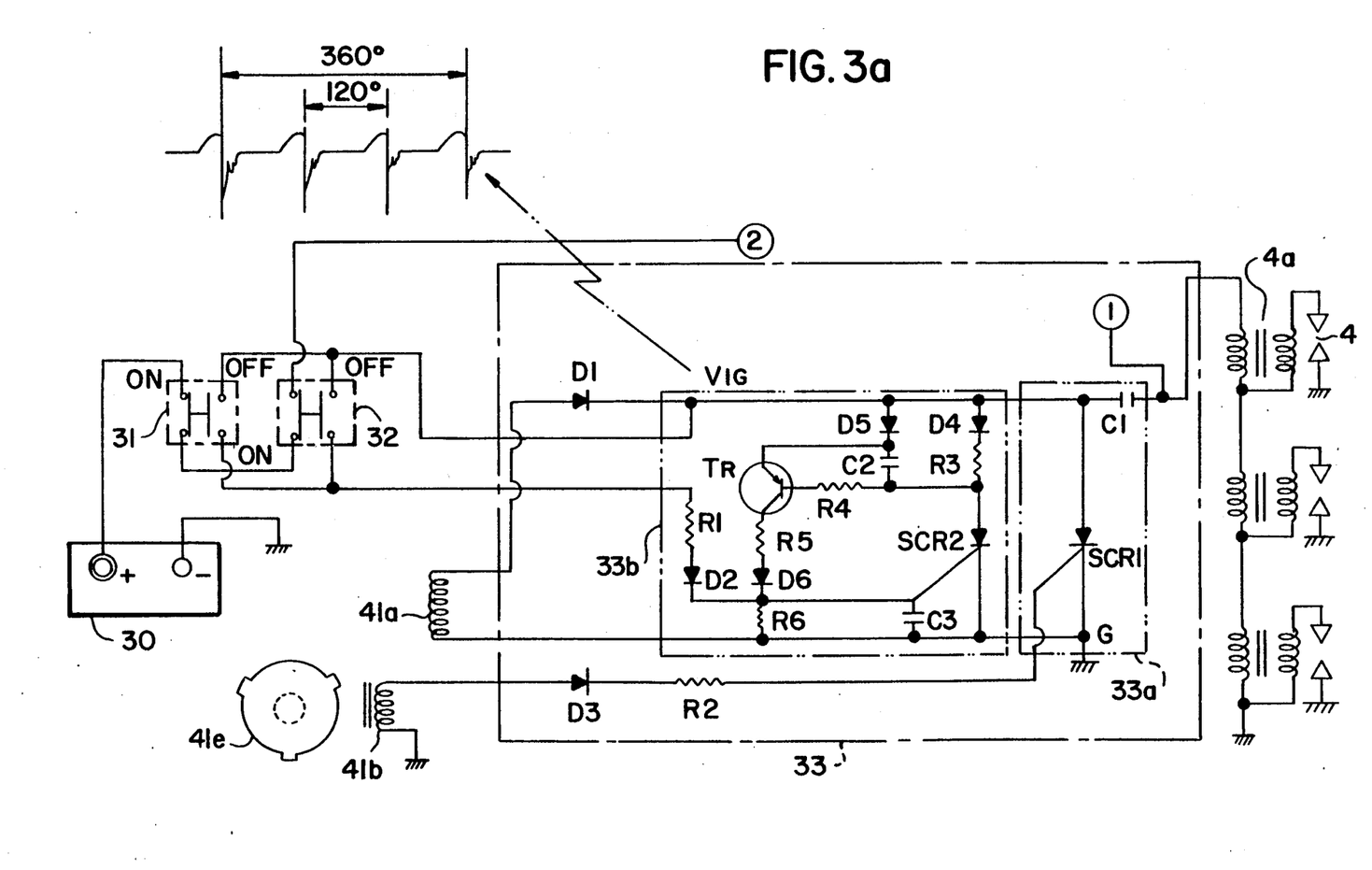
FIGS. 3a and 3b are a circuit showing a CDI unit provided in the control system.
Figure 3B:
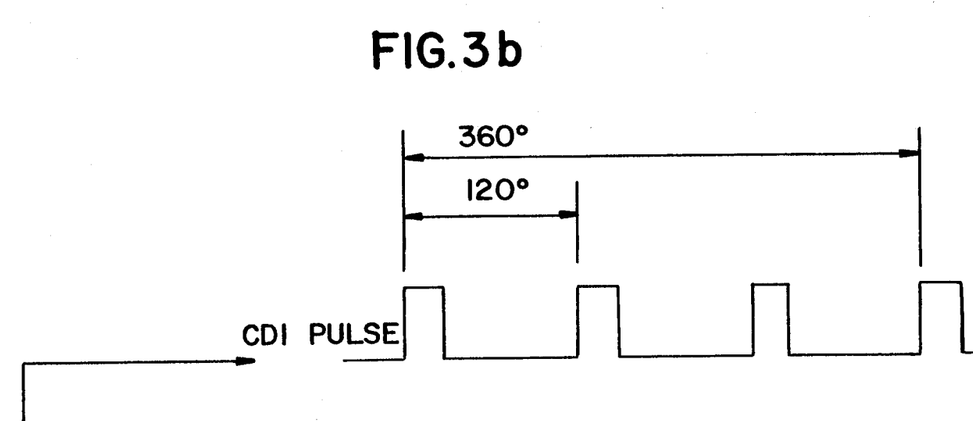

Referring to FIG. 3 showing the CDI unit 33, the exciter coil 41a is connected to an ignition source VIG of an ignition source short-circuiting circuit 33b through a diode D1. The ignition source short-circuiting circuit 33b has a first diode D4 and a second diode D5 anodes of which are connected to the source VIG. Cathodes of the diodes D4 and D5 are connected to an anode of a thyristor SCR2 through a resister R3 and a capacitor C2, respectively. A cathode of the thyristor SCR2 is connected to the ground G. The cathode of the second diode D5 is further connected to an emitter of a PNP transistor TR. A base of the transistor TR is connected to the anode of the thyristor SCR2 through a resister R4. A collector of the transistor TR is connected to a gate of the thyristor SCR2 through a resister R5 and a diode D6. A resister R6 and a capacitor C3 are connected between the gate of the thyristor SCR2 and the ground G in parallel to each other for preventing noises and commutation caused by an increasing rate of critical off voltage.

OFF-terminals of the ignition switch 31 and the kill switch 32 are connected to the source VIG and to the gate of the thyristor SCR2 through a resister R1 and a diode D2.

An ignition circuit 33a is a well-known capacitor discharge ignition circuit and comprises a capacitor C1 and a thyristor SCR1 to which the source VIG is connected. The pulser coil 41b is connected to a gate of the thyristor SCR1 through a diode D3 and a resister R2. The pulser coil 41b is provided adjacent a crank angle sensor disk 41e of the magneto 41.

Figure 4:
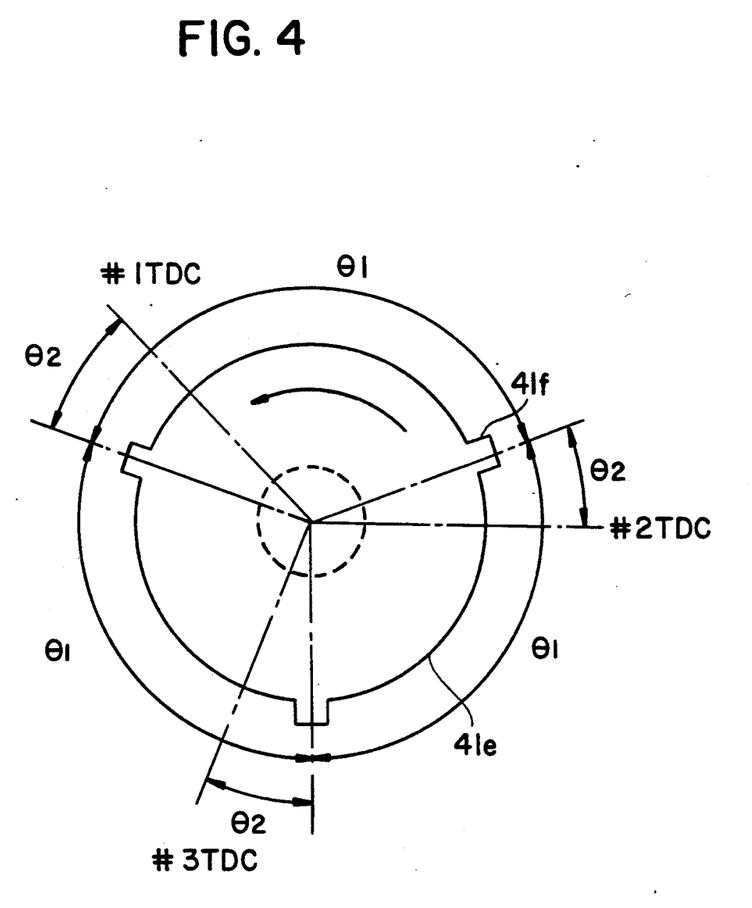
FIG. 4 is a front view showing a crank angle disk in the CDI unit.

Referring to FIG. 4, the crank angle sensor disk 41e has three projections (notches) 41f formed on an outer periphery thereof at equal intervals $\theta 1$ (120 degrees). The projections 41f represent the before top dead center (BTDC) $\theta 2$ (for example 15 to 20 degrees) of No.1 to No.3 cylinders. When the disk 41e is rotated, the pulser coil 41b detects the positions of the projections 41f in accordance with electromagnetic induction and produces an ignition trigger signal in the form of a pulse.

The trigger signal is applied to the thyristor SCR1 at a predetermined timing. The thyristor SCR1 is connected to the ground G. The capacitor C1 is connected to the primary coils 4a of the spark plugs 4 and to a pulse detecting circuit 33c.

The CDI unit 33 further comprises a waveform shaping circuit 33d, a duty control circuit 33e and a pulse generating circuit 33f which are connected to the battery 30 through ON-terminals of the kill switch 32 and the ignition switch 31. The pulse generating circuit 33f produces CDI pulse signals (FIG. 3) in synchronism with the source VIG. The CDI pulse signals are applied to the I/O interface 25 of the control unit 20 as hereinbefore described.

In the present invention, the pulser coil 41b produces an ignition trigger signal at every crank angle 120° to ignite three cylinders at the same time. The pulse generating circuit 33f produces a CDI pulse signal at every crank angle 120° to inject fuel from the fuel injectors 11 in three cylinders at the same time.

Figure 2A:
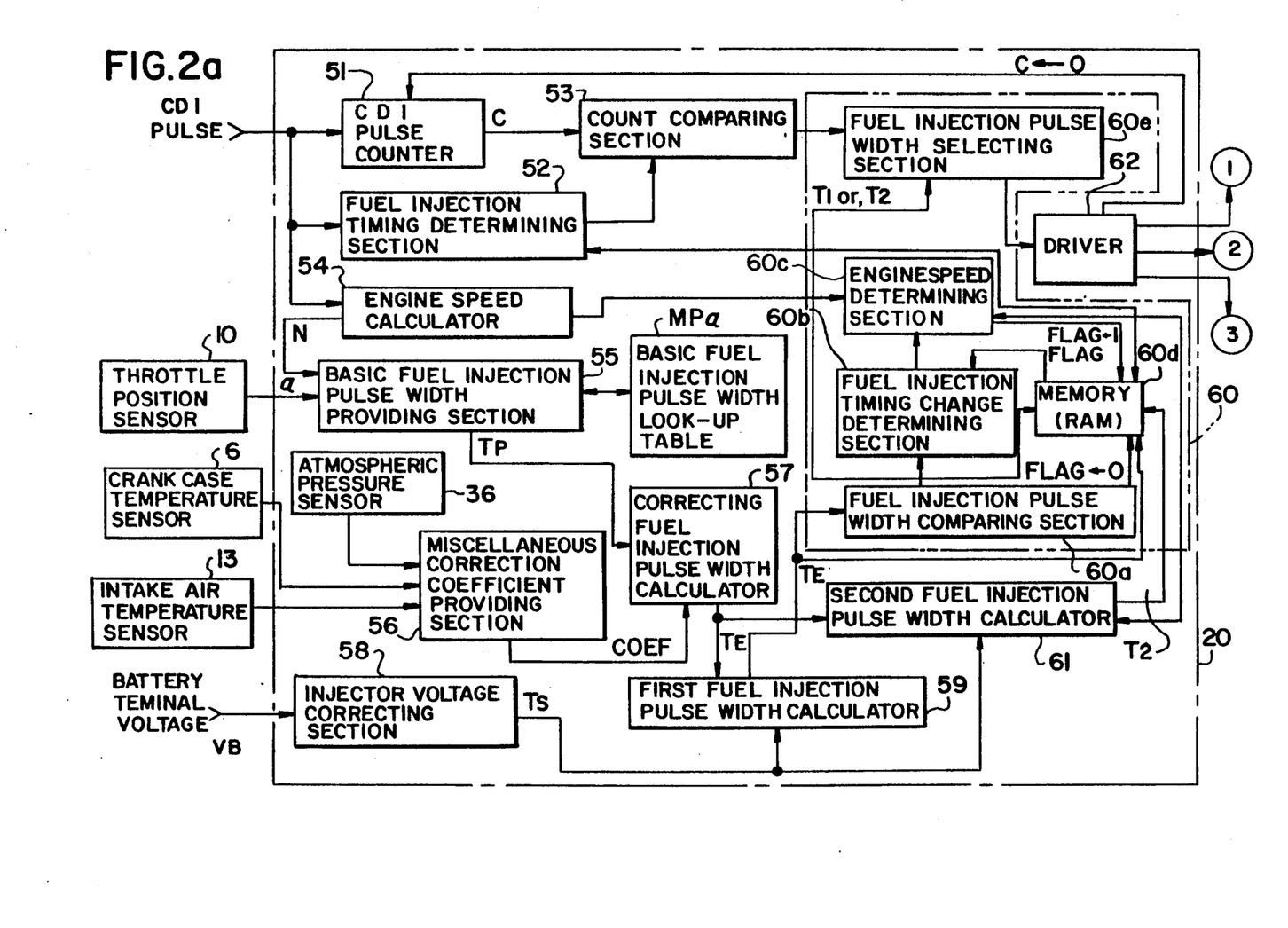
FIGS. 2a and 2b show a block diagram of the control system.
Figure 2B:
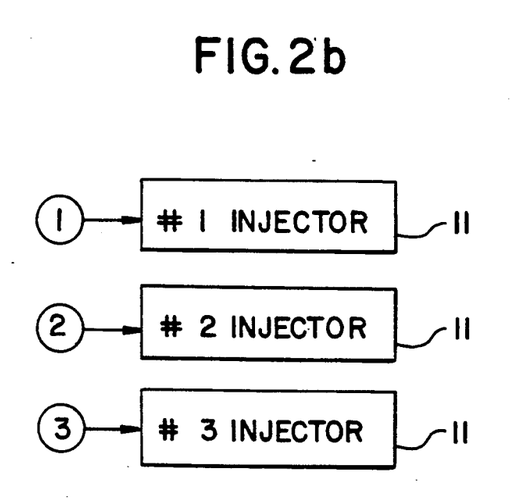

Referring to FIG. 2, the ECU 20 has an engine speed calculator 54 to which the CDI pulse signal from the CDI unit 33 is fed to calculate the engine speed N. In the engine speed calculator, a period f is obtained in accordance with the CDI pulse input interval t and the crank angle $\theta 1$ (f=dt/d$\theta 1$) to calculate engine speed N (N=60/2 $\pi$ f).

The engine speed N calculated in the calculator 54 and the throttle opening degree detected by the throttle position sensor 10 are applied to a basic fuel injection pulse width providing section 55. The basic fuel injection pulse width providing section 55 retrieves a basic fuel injection pulse width Tp from a basic fuel injection pulse width look-up table MP $\alpha$ in accordance with the engine speed N and the throttle opening degree $\alpha$ as parameters.

The basic fuel injection pulse widths Tp are obtained in accordance with a quantity of the intake air for dividing engine speed N and throttle opening degree $\alpha$ and stored in addresses of ROM 22 as a three-dimensional look-up table MP$\alpha$. Thus, the fuel injection control having a good response to the throttle valve 9a is achieved.

The ECU 20 has a miscellaneous correction coefficient providing section 56 for correcting crankcase temperature, intake air temperature and altitude. A miscellaneous correction coefficient COEF is calculated in dependency on an atmospheric pressure Po from the atmospheric pressure sensor 36, a crankcase temperature TmC from the crankcase temperature sensor 6 and an intake air temperature TmA from the intake air temperature sensor 13. The correcting coefficient COEF is the product of correcting values which are calculated by interpolation based on the respective correcting values retrieved from look-up tables stored in the ROM 22.

The basic fuel injection pulse width Tp, and miscellaneous correction coefficient COEF are applied to a correcting fuel injection pulse width calculator 57 where a correcting fuel injection pulse width TE is calculated (TE=Tp×COEF). The correcting fuel injection pulse width TE is provided for calculating a necessary amount of fuel for one combustion stroke of the engine.

When the voltage of VB the battery 30 decreases, the effective injection pulse width actually provided by the injector 11 reduces. In order to correct the reduction of the pulse width, an injector voltage correcting section 58 is provided in the ECU 20. The injector voltage correcting section 58 has a look-up table (not shown) storing a plurality of pulse widths in accordance with the terminal voltage VB of the battery 30. The pulse width is a period of time within which fuel is not injected although the voltage VB is applied to the injector. An injector voltage correcting width Ts corresponding to the pulse width retrieved from the table is provided in the section 58.

The correcting fuel injection pulse width TE, and the injector voltage correcting width Ts are applied to a first fuel injection pulse width calculator 59 where a first fuel injection pulse width T1 is calculated (T1=TE+Ts). The first fuel injection pulse width T1 is provided for injecting fuel from the injector 11 at one time for one combustion stroke of the engine and stored in a predetermined address of a memory 60d (RAM 23) of a fuel injection control section 60.

The correcting fuel injection pulse width TE and the injector voltage correcting width Ts are further applied to a second fuel injection pulse width calculator 61 where a second fuel injection pulse width T2 is calculated (T2=TE×2+Ts). The second fuel injection pulse width calculator 61 is operated in accordance with a signal from an engine speed determining section 60c of the fuel injection control section 60. The second fuel injection pulse width T2 is provided for injecting a necessary amount of fuel for two combustion strokes at one time from the fuel injector 11 and stored in the memory 60d.

Since the injector voltage correcting pulse width Ts is a response time lag of the fuel injector 11 in response to the battery voltage, the second fuel injection pulse width T2 is calculated to double the correcting fuel injection pulse width TE and to add the injector voltage correcting width Ts to the doubled correcting fuel injection pulse width TE (T2=TE×2 +Ts).

The fuel injection control section 60 comprises a fuel injection pulse width comparing section 60a in which the first fuel injection pulse width T1 calculated at the section 59 is compared with a controllable minimum fuel injection pulse width (for example 2 ms.) TiSET stored in the ROM 22. The minimum pulse width TiSET is a functional minimum pulse width determined in accordance with the characteristic of the fuel injector 11 for obtaining a stable fuel injection amount.

When T1>TiSET, the comparing section 60a sends a signal to the memory 60d to clear an injection timing determining flag FLAG which has been stored in the memory 60d at a previous program (FLAG←0). When T1≦TiSET, a command signal is applied to a fuel injection timing change determining section 60b. The section 60b detects the timing determining flag FLAG stored in the memory 60d and sends a signal. The determining section 60b produces a signal to the engine speed determining section 60c in accordance with the result of the comparison.

The engine speed determining section 60c is applied with the engine speed N from the engine speed calculator 54 and operated to compare the engine speed N with a smaller value NL1 and a larger value NL2 when the signal from the section 60b is applied. When FLAG=0, the engine speed N is compared with the larger value NL2. When FLAG=1, the engine speed N is compared with the smaller value NL1 (for example 1000 rpm). The larger value is obtained by adding the value NL1 with a predetermined offset value A (for example 1 bit of minimum resolution for calculating the engine speed) (NL2=NL1+A). When N≦NL1 or N≦NL2, it is determined that one time of the fuel injection per one rotation of the engine is changed to one time of the fuel injection per two rotations of the engine. The determining section 60c produces a signal which is applied to the second fuel injection pulse width calculator 61 and further produces a signal which is applied to the memory 60d to set the flag FLAG (FLAG←1). The calculator 61 is actuated to calculate the second fuel injection pulse width T2. Otherwise, the fuel is injected once from the fuel injector 11 per one rotation of the engine.

Figure 5:
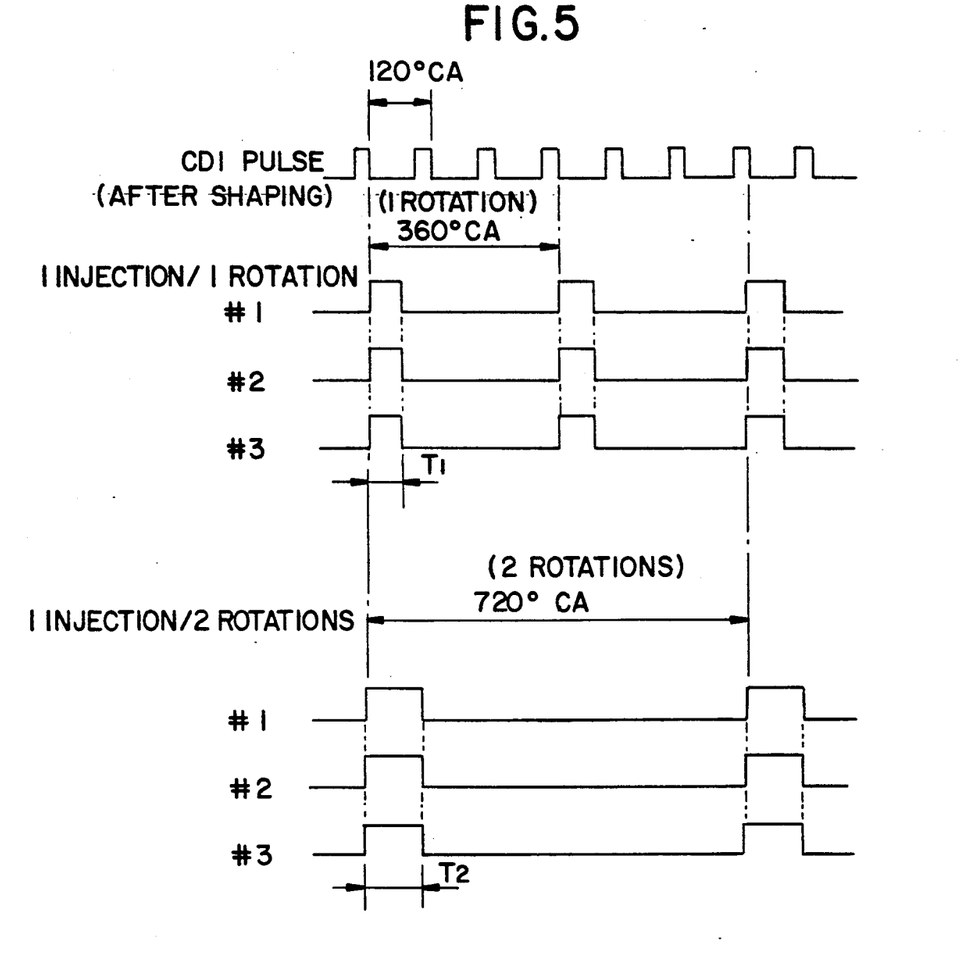
FIG. 5 is a time chart showing CDI pulse and fuel injection pulse.

In the two-cycle engine, fuel injected from the fuel injector 11 is supplied to the combustion chamber through the crankcase 5, so that the fuel stays in the crankcase 5. As shown in FIG. 5, if the timing of injection fuel is changed from at every one rotation of the engine to at every two rotations of the engine, the air-fuel ratio of the engine can not be varied.

Figure 6:
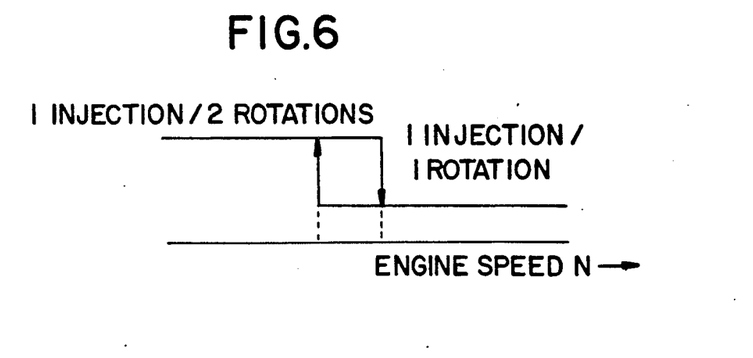
FIG. 6 is a diagram showing the change of fuel injection corresponding to engine speed.

Further, as shown in FIG. 6, a hysteresis zone having the offset value A is provided between the changing times of the fuel injection from at one rotation of the engine and at two rotations of the engine, and vice virsa, thereby preventing a rapid variation of the air fuel mixture caused by the changing of injection timing, and hence hunting of the control system.

A fuel injection pulse width selecting section 60e is provided for selecting the fuel injection pulse width in accordance with a fuel injection timing.

In order to determine the fuel injection timing, a CDI pulse counter 51 is provided in the control unit 20. The CDI pulse counter 51 counts the CDI pulses applied from the CDI unit 33 and produces a count C which is applied to a count comparing section 53. When the drive signal is applied from the driver 62 to the fuel injectors 11, the counter 51 is reset to clear the count C. A fuel injection timing determining section 52 detects the flag FLAG in the memory 60d for determining the fuel injection timing and sets a fuel injection timing count CSET which is applied to the count comparing section 53. When FLAG=0, since the fuel is injected from the injector at every one rotation of the engine, the fuel injection timing count CSET is set to 3 (corresponding to the crank angle 360°) in the comparing section 53. When FLAG=1, since the fuel is injected at every two rotations of the engine, the timing count CSET is set to 6 (corresponding to the crank angle 720°). The count comparing section 53 compares the CDI pulse count C with the fuel injection timing count CSET. When C≧CSET, the comparing section 53 produces a count-up signal which is applied to the fuel injection pulse width selecting section 60e.

In the selecting section 60e, when the count-up signal of C≧3 is applied, the first fuel injection pulse width T1 stored in the memory 60d is read and the drive signal in dependency on the first pulse width T1 is applied to the fuel injector 11 through the driver 62. When the count-up signal of C≧6 is applied, the second fuel injection pulse width T2 is read for driving the fuel injectors 11 through the driver 62.

Describing the operation, when the engine starts, an alternating voltage generated in the exciter coil 41a is rectified by the diode D1 and applied to the capacitor C1 in the ignition circuit 33a to charge the capacitor.

The pulser coil 41b produces a reference signal voltage at a predetermined crank position and the voltage is applied to the gate of the thyristor SCR1 through the diode D3 and the resister R2.

When the voltage reaches a trigger level of the thyristor SCR1, the thyristor SCR1 becomes conductive so that the load charged in the capacitor C1 is discharged to a closed circuit comprising the capacitor C1, thyristor SCR1, primary coils of ignition coils 4a, and capacitor C1. Thus, high voltage of an extremely large positive going is produced in the secondary coils of the ignition coils 4a to ignite the spark plug 4.

At the same time, the pulse detecting circuit 33c detects the waveformes of pulses for the primary coils which are shaped by the waveform shaping circuit 33d, and a predetermined pulse duration of the pulses is determined by the duty control circuit 33e. The pulse generating circuit 33f generates the CDI pulse in synchronism with the source VIG. The fuel injection pulse is applied to the fuel injector 11 in synchronism with the CDI pulse to start the engine.

The control unit 20 determines based on the CDI pulses that the engine speed exceeds a fuel injection allowable speed, a fuel injection pulse width is determined in accordance with crankcase temperature TmC and atmospheric pressure Po to start the engine.

After starting of the engine, the fuel injection pulse width for ordinary operation of the engine is calculated and fuel injection timing is determined based on the CDI pulses.

In order to stop the engine, one of the ignition switch 31 and the kill switch 32 is turned off so that off contacts of the switch close. Consequently, the voltage at the source VIG is applied to the gate of the thyristor SCR2 through the resister R1 and the diode D2 in the ignition source short-circuiting circuit 33b to render the thrystor SCR2 conductive. Thus, the source VIG is short-circuited through the resister R3 and the first diode D4, and the capacitor C2 is charge through the second diode D5.

As shown in FIG. 3, since the source VIG is the intermittent voltage, the source voltage VIG reduces to a ground level, so that the thyristor SCR2 becomes off. Consequently, the capacitor C2 discharges the current which is supplied to the base of the transistor TR to turn on the transistor.

When the source voltage VIG generates again, the current is directly supplied to the gate of the thyristor SCR2 through the second diode D5, transistor TR, resister R5, and diode D6. Thus, the thyristor SCR 2 is turned on again to short-circuit the source VIG and to charge the capacitor C2.

This process is repeated so that a necessary energy for igniting the spark plug 4 is not applied to the primary coils of the ignition coils 4. Consequently, the voltage is reduced lower than the limit value for the ignition, thereby stopping the engine.

In the system, if the kill switch 32 is turned off once to turn on the thyristor SCR2, the thyristor SCR2 is automatically turned on and off in accordance with the capacitor C2 and the transistor TR until the engine stops. Therefore, it is not necessary to maintain the kill switch 32 in off-state.

After the engine stops, the control unit 20 is supplied with the power from the battery through the self-shut relay 29 to be in a self-hold state. After a predetermined time elapses, the self-shut relay 29 is turned off to cut off the power to the control unit 20 and hence to stop the operation.

Figure 7A:
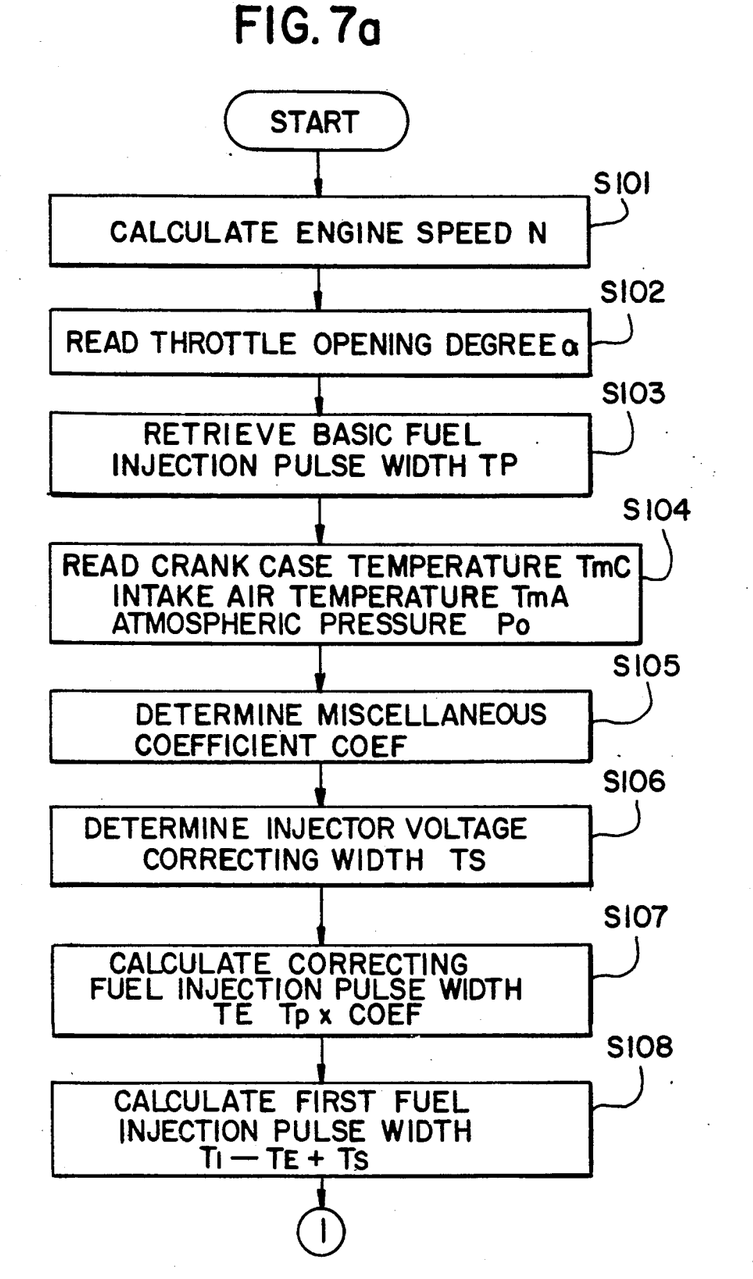
FIGS. 7a and 7b are flowcharts showing the operation for determining fuel injection pulse width.
Figure 7B:
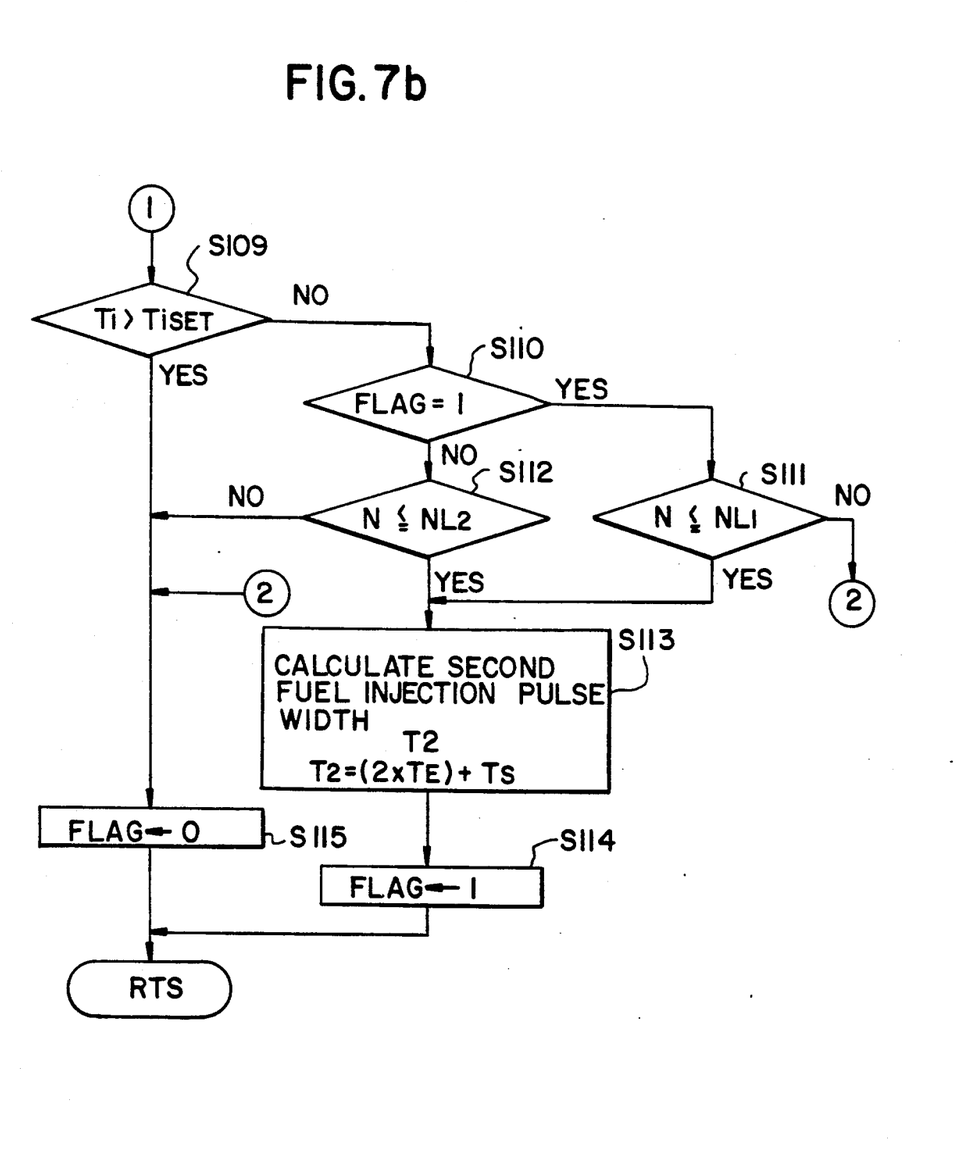

The operation of the system of the present invention is described hereinafter with reference to FIG. 7. The program is repeated at a predetermined crank timing.

At a step S101, the engine speed N is calculated in dependency on the interval between the input of the CDI pulses. At a step S102, the throttle opening degree α is read from the throttle position sensor 10.

At a step S103, the basic fuel injection pulse width Tp is retrieved from the basic fuel injection pulse width look-up table MP α in accordance with the engine speed N calculated at the step S101 and the throttle opening degree α read at the step S102. The basic fuel injection pulse width Tp may be obtained directly or by interpolation in dependency on the injection pulse widths retrieved from the table MP α. The crankcase temperature TmC from the crankcase temperature sensor 6, intake air temperature TmA from the intake air temperature sensor 13 and the atmospheric pressure Po from the atmospheric pressure sensor 36 are read at a step S104. The miscellaneous correction coefficient COEF is obtained in dependency on the above-described parameters at a step S105. The injector voltage correcting width Ts is obtained dependent on the terminal voltage VB at a step S106. The basic fuel injection pulse width TE is calculated at a step S107 in dependency on the basic fuel injection pulse width Tp and miscellaneous correction coefficient COEF obtained at the steps S103 and S105, respectively. At a step S108, the first fuel injection pulse width T1 is calculated in accordance with the correcting fuel injection pulse width TE and the injector voltage correcting width Ts obtained at step S106.

The program goes to a step S109 where the first pulse width T1 is compared with the controllable minimum pulse width TiSET. When Ti>TiSET, the program goes to a step S115 where the fuel injection timing flag FLAG is cleared (FLAG←0) and the program is terminated.

On the other hand, when Ti≦TiSET, the program goes to a step S110 where it is determined whether the flag FLAG is set or not. When FLAG=1, the program goes to a step S111 where the engine speed N is compared with the set value NL1. When FLAG=0 at step S110, the program goes to a step S112.

At the step S111, when N>NL1, the program goes to the step S115. When N≦NL1, the program goes to a step S113. At the step S112, the engine speed N is compared with the set value NL2. When N>NL2, the program goes to the step S115. When N≦NL2, the program goes to the step S113 where the second fuel injection pulse width T2 is calculated. At a step S114, the flag is set (FLAG←1) and the program is terminated.

The first fuel injection the second pulse width T1 or pulse width T2 is applied to the fuel injectors 11 once at every one rotation or once at two rotations of the engine in synchronism with the CDI pulse.

The operation of the fuel injection timing will be described with reference to the flowchart of FIG. 8.

Figure 8:
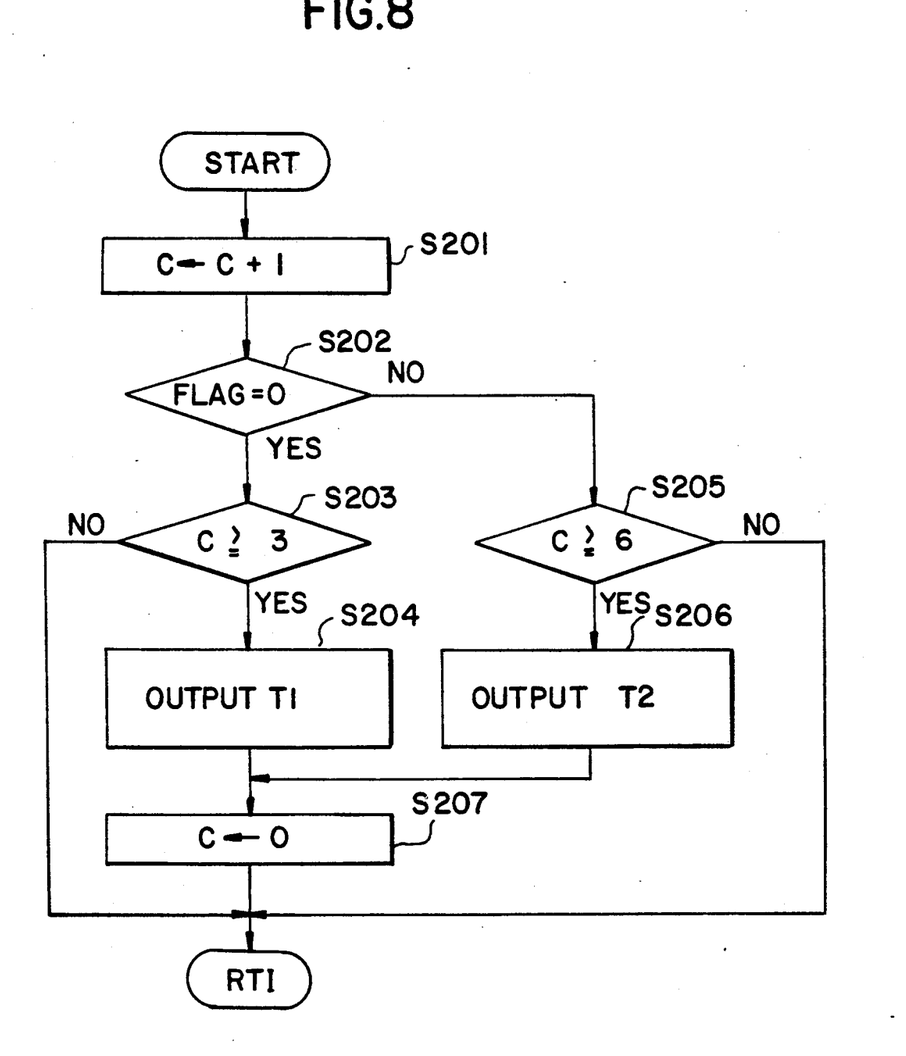
FIG. 8 is a flowchart showing the operation for determining injection timing.

When the CDI pulse is applied from the CDI unit 33, an interruption routine shown in the flowchart of FIG. 8 is started. AT a step S201, the CDI pulse count C is added with 1 (C←C+1). The program goes to a step S202 where it is determined whether the fuel injection timing. determining flag FLAG is set or not. When FLAG=0, that is the flag is cleared, it is determined that the fuel injection is performed once per one rotation of the engine. The program goes to a step S203 where it is determined whether the count C reaches the fuel injection timing count CSET. When the flag is cleared, the count CSET is 3. Thus, when C<CSET, that is C<3, it means that the crank angle is less than 360° after the last fuel injection so that the engine is not rotated once. The program is terminated to wait for the next input of the CDI pulse. When C≧3, it means that the crank angle is 360° and the engine is rotated once after the last fuel injection. The programes goes to a step S204 where the first fuel injection pulse width T1 is produced. The program goes to a step S207.

When FLAG=1 at the step S202, that is the flag is set, it is determined that the fuel injection is performed once per two rotations of the engine. The program goes to a step S205 where it is determined whether count C reaches the timing count CSET or not. When the flag is set, the timing count SCET is 6. When C<6, it means that the crank angle is less than 720° after the last fuel injection, so that the engine is not rotated twice. The program is terminated. When C≧6, it means that the crank angle is 720° and the engine is rotated twice. The program goes to a step S206 where the second fuel injection pulse width T2 is produced. At the step S207, the CDI pulse count C is cleared.

In accordance with the present invention, the controllable range of the fuel injection pulse width is determined based on the controllable minimum fuel injection pulse width. Thus, even if the amount of fuel is small in low engine speed range, the injection pulse width is not reduced smaller than the functional limit of the injector.

Consequently, if the fuel injector having a common dynamic range is used, a stable fuel injection amount is obtained in the entire engine operating range, so that the combustion of the engine is stabilized, thereby increasing the power of the engine.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A fuel injection control system for a two-cycle engine having a fuel injector and an electronic control unit for controlling operation of the engine, comprising:

detector means for detecting engine operating conditions including speed of the engine;

first pulse width calculating means for calculating a first fuel injection pulse width based on said engine operating conditions detected by said detector means, said first fuel injection pulse width corresponding to amount of fuel necessary for one combustion stroke of the engine;

second pulse width calculating means for calculating a second fuel injection pulse width based on said engine operating conditions detected by said detector means, said second fuel injection pulse width corresponding to an amount of fuel necessary for two combustion strokes of the engine;

comparator means for comparing said first fuel injection pulse width calculated by said first calculating means with a minimum value controllable by said fuel injector;

selecting means for selecting said first fuel injection pulse width when said first fuel injection pulse width is larger than said minimum value, and for selecting said second fuel injection pulse width when said first fuel injection pulse width is smaller than said minimum value; and driving means for driving said fuel injector at an injection pulse width selected by said selecting means.

2. The system according to claim 1, wherein said selecting means includes selector means for selecting said second fuel injection pulse width when the detected engine speed is lower than a predetermined speed.

3. The fuel injection control system according to claim 1 wherein said driving means is adapted to drive said fuel injector so as to inject fuel every single rotation of said engine when said first fuel injection pulse width is selected by said selecting means and to inject fuel every other rotation of said engine when said second fuel injection pulse width is selected by said selecting means.

4. The fuel injection control system according to claim 1, wherein said minimum value represents a functional minimum pulse width which said fuel injector can inject stably.

5. The fuel injection control system according to claim 1, wherein said minimum value is approximately 2 ms.

6. The fuel injection control system according to claim 1 mounted on a snowmobile.

7. The fuel injection control system according to claim 1, further comprising:

determining means for determining whether said engine speed is lower than a preset value when said first fuel injection pulse width is smaller than said minimum value thereby imposing said driving means to inject fuel every one rotation of said engine when said engine speed is determined to be lower than said preset value and for imposing said driving means to inject fuel once for two rotations of said engine.

8. The fuel injection control system according to claim 7, wherein said preset value is approximately idling engine speed.

9. The fuel injection control system according to claim 7, wherein said preset value is approximately 1,000 rpm.

* * * * *